(12) United States Patent
Liang

(10) Patent No.: US 7,497,660 B2
(45) Date of Patent: Mar. 3, 2009

(54) MULTI-METERED FILM COOLED BLADE TIP

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 396 days.

(21) Appl. No.: 11/243,762

(22) Filed: Oct. 5, 2005

(65) Prior Publication Data

US 2006/0029497 A1 Feb. 9, 2006

Related U.S. Application Data

(63) Continuation of application No. 10/741,376, filed on Dec. 19, 2003, now Pat. No. 6,971,851.

(60) Provisional application No. 60/454,119, filed on Mar. 12, 2003.

(51) Int. Cl.
*F01D 5/18* (2006.01)

(52) U.S. Cl. .......................... 416/1; 416/97 R; 415/115

(58) Field of Classification Search ...................... 416/1, 416/97 R; 415/115
See application file for complete search history.

(56) References Cited

U.S. PATENT DOCUMENTS

| | | | |
|---|---|---|---|
| 4,142,824 A | 3/1979 | Andersen | |
| 4,411,597 A | 10/1983 | Koffel et al. | |
| 4,540,339 A | 9/1985 | Horvath | |
| 4,753,575 A | 6/1988 | Levengood et al. | |
| 4,893,987 A | 1/1990 | Lee et al. | |
| 5,382,133 A * | 1/1995 | Moore et al. | 415/115 |
| 5,651,662 A * | 7/1997 | Lee et al. | 416/97 R |
| 5,688,104 A * | 11/1997 | Beabout | 415/115 |
| 5,733,102 A | 3/1998 | Lee et al. | |
| 5,902,093 A | 5/1999 | Liotta et al. | |
| 6,099,251 A * | 8/2000 | LaFleur | 416/97 R |
| 6,164,914 A | 12/2000 | Correia et al. | |
| 6,183,198 B1 * | 2/2001 | Manning et al. | 416/97 R |
| 6,231,307 B1 | 5/2001 | Correia | |
| 6,471,479 B2 | 10/2002 | Starkweather | |
| 6,491,496 B2 | 12/2002 | Starkweather | |
| 6,494,678 B1 | 12/2002 | Bunker | |
| 6,527,514 B2 | 3/2003 | Roeloffs | |
| 6,932,571 B2 * | 8/2005 | Cunha et al. | 416/97 R |
| 6,971,851 B2 * | 12/2005 | Liang | 416/1 |

* cited by examiner

*Primary Examiner*—Ninh H Nguyen
(74) *Attorney, Agent, or Firm*—Christopher & Weisberg, P.A.

(57) ABSTRACT

A rotating blade for a gas turbine engine is provided which is configured to uniformly diffuse cooling air from an internal cavity about the tip of the rotating blade. The rotating blade includes a secondary cavity interposed between an internal cavity and the peripheral edge of the blade tip, wherein the secondary cavity steps down the cooling air pressure, decreasing the momentum of the cooling air exiting the rotating blade tip. The cooling air is diffused about the tip of the rotating blade into cooling slots aligned along the peripheral edge, such that a sub-boundary layer of cooling air is built-up adjacent to surface of the airfoil.

33 Claims, 3 Drawing Sheets

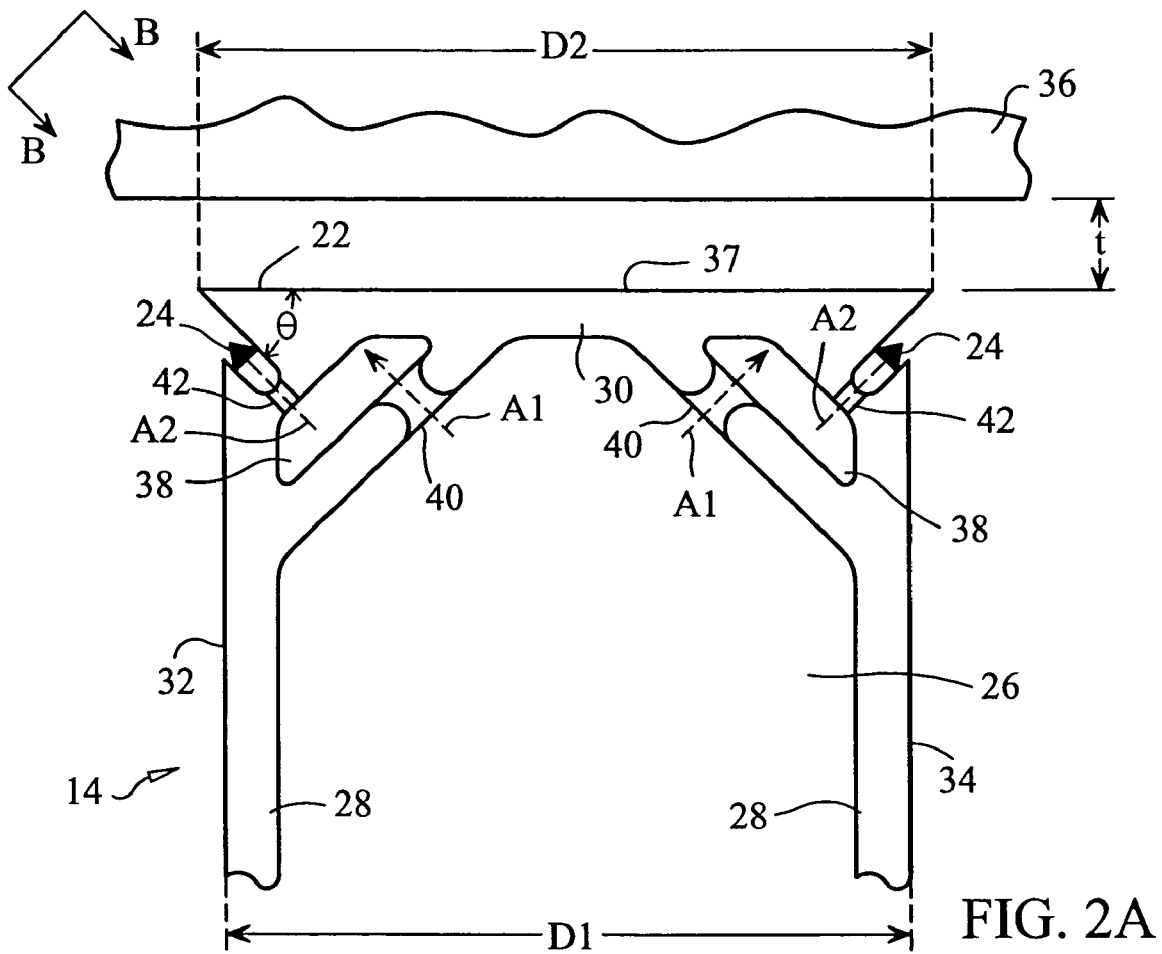
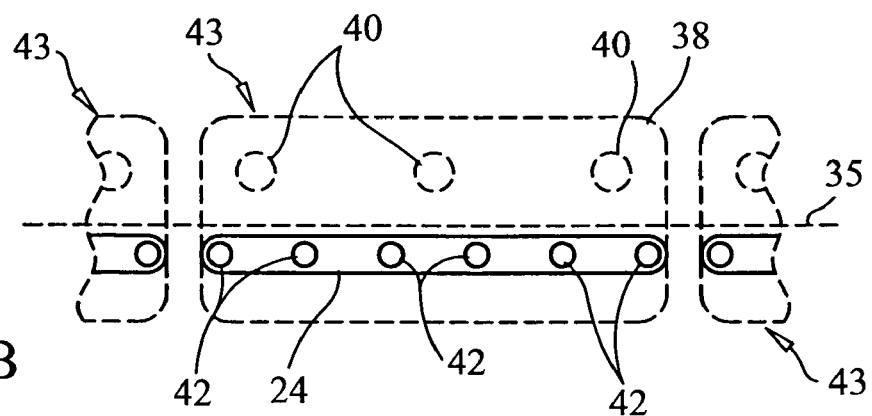

MULTI-METERED FILM COOLED BLADE TIP

CROSS-REFERENCE TO RELATED APPLICATION

This application is a Continuation of Utility patent application Ser. No. 10/741,376, filed Dec. 19, 2003 now U.S. Pat. No. 6,971,851, by George Liang, entitled MULTI-METERED FILM COOLED BLADE TIP, which application is related to and claims priority from U.S. Provisional Patent Application Ser. No. 60/454,119, filed Mar. 12, 2003, by George Liang, entitled MULTI-METERED FILM COOLED BLADE TIP, the entirety of all of which are incorporated herein by reference.

STATEMENT REGARDING FEDERALLY SPONSORED RESEARCH OR DEVELOPMENT n/a

FIELD OF THE INVENTION

The present invention relates to gas turbine blades, namely, a method and system for cooling blade surfaces along the tip of a rotating blade.

BACKGROUND OF THE INVENTION

This invention relates to turbomachinery, and the challenges involved in the production of power or propulsive thrust. In a piece of turbomachinery, like a gas turbine engine, air is pressurized in a compressor then mixed with fuel and burned in a combustor to generate hot combustion gases. The hot combustion gases are expanded within the turbine section where energy is extracted to power the compressor and to produce useful work, such as powering a propeller for an aircraft in flight or turning a generator to produce electricity. The hot core gas travels through a series of turbine stages. A turbine stage may include a row of stationary vanes followed by a row of rotating blades. Each row within the turbine may include a number of airfoils. Each airfoil may be solid, or may contain one or more internal cavities surrounded by an external wall to reduce weight and/or to facilitate a means for internal cooling. The pressure and suction sides of the external wall extend between the leading and trailing edges of the airfoil. Stationary vane airfoils extend span-wise between inner and outer end walls, and the rotating blade airfoils extend span-wise between a platform (typically attached to a rotor disk or other rotary base) and the blade tip.

The stationary vanes and rotating blades of the gas turbine are exposed to high temperature gases, consisting of a mixture of combustion products and cooling and leakage air. In actual practice, the temperature of the gases exiting the combustor will typically exceed the capabilities of the materials used to fabricate the turbine components, necessitating the need for cooling methods to maintain metal temperatures within material specification limits. Generally, the hot gas flows around the pressure and suction side surfaces of the airfoil, from the leading edge to the trailing edge.

However, in the case of a rotating blade, some of the hot gas flows from the pressure side of the airfoil to the suction side through the gap necessarily formed by the rotating blade tip and the adjoining stationary blade outer air seal. Thus, the tip surfaces are exposed to the high temperature environment of the hot gas. During operation of the gas turbine engine, heating of the blade tips by the hot gas may lead to premature thermal distress or failure of the component. It is known in the art that the edges formed by the intersection of the airfoil and tip surfaces are subject to very high heat loads and are therefore predisposed to thermal distress. Because of the complexity and relative high cost of replacing or repairing the blades, it is desirable to prolong the life of the blade tips and respective blades as long as possible.

Air, typically bled off of a compressor stage at a lower temperature and higher pressure than the hot gas passing through the turbine section, may be used to cool the airfoils. The supplied air is generally at higher pressure and lower temperature than that of the hot gases surrounding the blade. Thus, the air extracted from the compressor provides the low temperature sink required for convection heat transfer and film cooling, while the difference in pressure provides the energy required to pass the cooling air through the stationary vane or rotating blade airfoil out to the surrounding gas flow. This use of cooling air permits increased turbine power output by allowing operation of the engine at higher gas temperatures. However, injection of cooling air into the turbine can also reduce gas turbine efficiency.

The gas turbine engine efficiency is, at least in part, dependant upon the extent to which the high temperature gases leak across the gap between the turbine blade tips and the seals or shrouds which surround them. The leakage quantity is typically minimized by positioning the radially-outward blade tip in close proximity to the outer air seal. However, differential thermal elongation and dynamic forces between the blade tip and outer air seal can cause rubbing therebetween. To accommodate this rubbing, abrasive tip treatments and/or squealer ribs, consisting of raised rails extending from the tip cap, may be employed. The squealer ribs are typically exposed to the hot combustion gases on multiple sides and are therefore difficult to cool.

It is therefore desirable to establish better cooling mechanisms along the surfaces of turbine blades, especially near the tip of rotating airfoils. Film cooling is one means to achieve this. A film of cooling air traveling along the surface of the airfoil transfers thermal energy away from the airfoil, increases the uniformity of cooling, and insulates the airfoil from the passing hot gas. However, film cooling is difficult to establish and maintain in the turbulent environment of the gas turbine engine. The presence of non-uniform pressure around the periphery of the airfoil further complicates the film cooling system. The film cooling system must function while discharging coolant to both the high and low pressure sides of the airfoil. In most cases, film cooling air is bled out of apertures extending through the external wall of the airfoil. The term "bled" reflects the small difference in pressure motivating the cooling air out of the internal cavity of the airfoil. However, many known film cooling systems are not efficient, and do not properly address the issues surrounding the cooling of the blade tip, at the edge or interface between the airfoil surfaces and the blade tip cap.

It is desirable therefore, to provide a system and method for cooling a turbomachine blade, and, in particular, to cool the tip region of a rotating airfoil.

SUMMARY OF THE INVENTION

A turbomachinery blade is provided having an airfoil section having proximal and distal end portions and defining an internal cavity and an outer aerodynamic surface having a distal edge circumscribing the distal end portion. The distal end portion further defines at least one each of a first and a second metering orifice, at least one metering cavity, and at least one longitudinal cooling slot disposed along and parallel to a portion of the distal edge. The internal cavity, the at least one first metering orifice, the at least one metering cavity, the at least one second metering orifice, and the at least one longitudinal cooling slot sequentially define a fluid passage from the internal cavity to the distal edge.

In another embodiment, a gas turbine engine blade is provided, having a proximal end portion, a distal end portion, and an airfoil section therebetween. The airfoil section includes an outer aerodynamic surface and defines an internal cavity. The distal end portion includes a distal end surface of the blade, the distal end surface being substantially disposed on a longitudinal cross-section to the airfoil section, a distal edge, the distal edge being a perimeter outline of the distal end surface, and a means for metering cooling fluid to flow from the internal cavity to a plurality of diffusion cooling slots defined along the distal edge by a plurality of discrete adjoining portions of the distal end surface and the outer aerodynamic surface.

The present invention also provides for a method for cooling a turbomachine blade. A cooling fluid is supplied into an internal cavity defined by an exterior wall of the blade. The exterior wall includes an outer aerodynamic surface and a distal end surface. The outer aerodynamic surface and a distal end surface intersect to form a distal edge surrounding the distal end surface. The cooling fluid is metered through a first metering orifice from the internal cavity into an metering cavity proximate the distal edge and defined by the exterior wall of the blade. The cooling fluid is also metered through a second metering orifice from the metering cavity into a longitudinal cooling slot defined by and parallel to a portion of the distal edge.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 2A is a cut-away spanwise sectional view of the distal end portion of the gas turbine engine blade of FIG. 1, taken along lines A-A in FIG. 1;

FIG. 2B is a schematic longitudinal view of a portion of the airfoil distal edge circumscribing the distal end portion of the blade in FIG. 1, taken along lines B-B in FIG. 2A;

DETAILED DESCRIPTION OF THE INVENTION

The present invention provides a rotating blade for a gas turbine engine which is configured to uniformly diffuse cooling air from an internal cavity about the tip of the rotating blade. The rotating blade includes a secondary cavity interposed between the internal cavity and the peripheral edge of the blade tip, wherein the secondary cavity steps down the cooling air pressure, decreasing the momentum of the cooling air exiting the rotating blade tip. The cooling air is diffused about the tip of the rotating blade such that a sub-boundary layer of cooling air is built-up adjacent to the surface of the airfoil, to more efficiently and effectively cool the blade tip.

As used herein, the term "metering" shall refer to the flow of fluid through a structure or device, or through a space, channel, or passage defined by a structure or device. The metered flow may be controlled as to a specific property of the fluid or the device, such as flow pressure, temperature, flow rate, cooling characteristics, etc.

Figure 1:
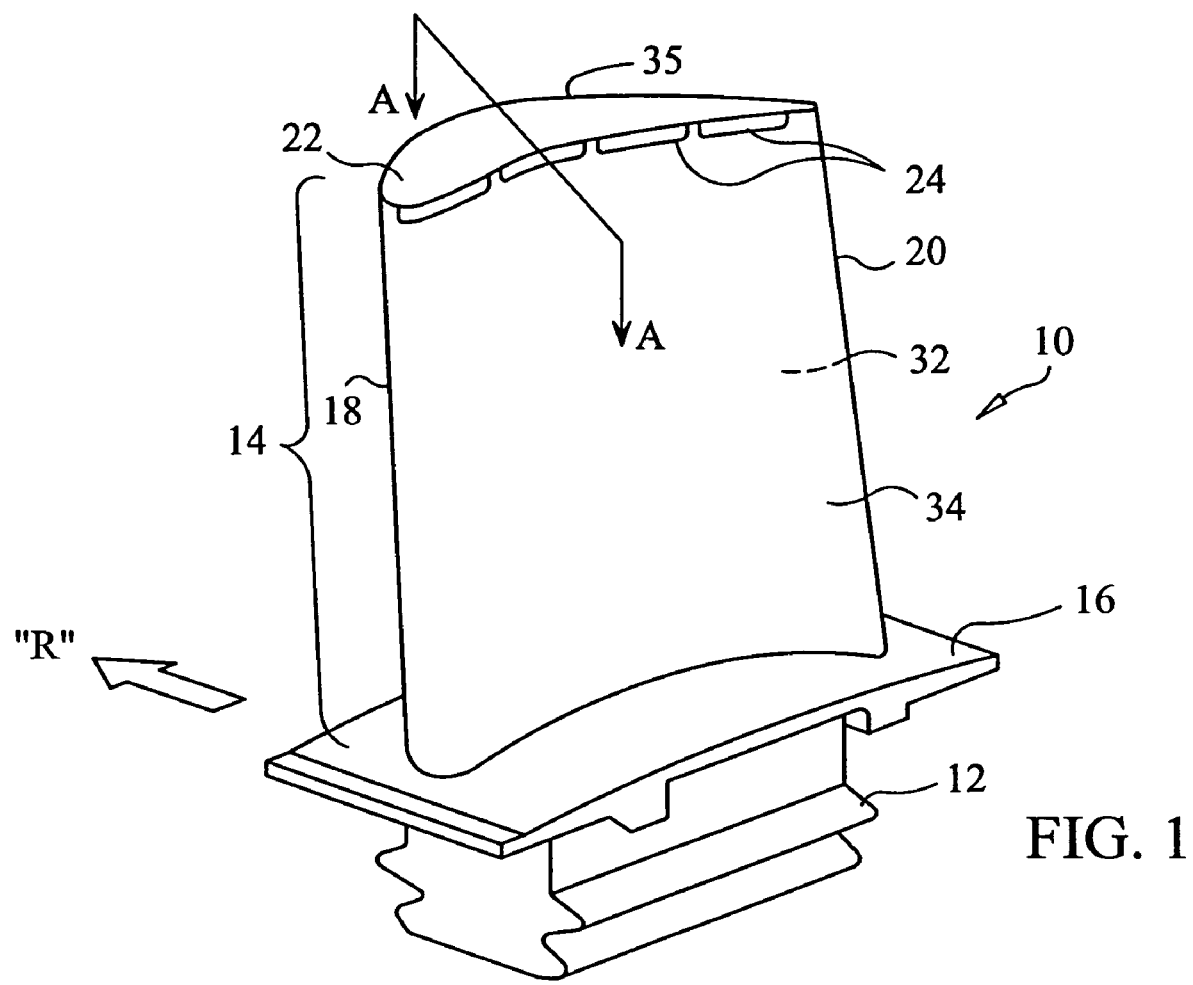
FIG. 1 is a perspective view of a first embodiment of a gas turbine engine blade constructed in accordance with the principles of the present invention.

Referring now to the drawing figures in which like reference designators refer to like elements, there is shown in FIG. 1 a perspective view of a first embodiment of a gas turbine engine blade constructed in accordance with the principles of the present invention, which includes a rotating blade designated generally as device 10. The rotating blade 10 includes a root portion 12 and an airfoil section 14, wherein a platform 16 is interposed between the root portion 12 and the airfoil section 14. The airfoil section 14 includes leading edge 18, a trailing edge 20, and an airfoil distal end tip portion, or "tip cap" 22. Additionally, longitudinal diffusion-cooling slots 24 are disposed on the distal end tip portion 22 as shown. The root section 12 is connected to a turbine engine, such as onto a rotor disk or other rotary base, such that the airfoil 14 rotates about the centerline of the turbine engine (not shown) in the "R" direction.

The airfoil section 14 generally refers to that portion of the blade above the platform 16, all the way to the distal end portion of the blade. The distal end portion of the blade may be of various shapes and sizes, and may be characterized as a defined distal end surface such as a relatively flat distal end tip cap 22 as shown in the blade 10 of FIG. 1. The airfoil section itself is meant to refer to the contoured portion of the blade around which fluid flows and generates "aerodynamic" forces. As used herein, "aerodynamic" shall mean fluid dynamic, or the general interaction between fluids and solids which create dynamic forces and motions on a body. In this case, the fluid would be the hot gases inside a turbine, whereas the solid body would be the turbine blade itself. The airfoil section 14 of blade 10 is therefore the "aerodynamic" portion of the blade 10, which may have one or more "aerodynamic" surfaces.

As illustrated in FIG. 1, the airfoil section 14 is bounded at its proximal end by the platform 16 and at its distal end by the tip cap 22. The tip cap 22 shown in FIG. 1 is but one version of the distal end portion of a gas turbine blade similar to that of blade 10. In all blades however, the airfoil section must terminate at its distal end portion. An airfoil section, like airfoil section 14 of blade 10, must also have an aerodynamic surface. The aerodynamic surface of blade 10 includes both a suction side surface 32, which is generally convex, and a pressure side surface 34, which is generally concave. These surfaces are bounded, like airfoil section 14 itself, by the platform 16 at their respective proximal ends and by a distal edge 35 which circumscribes or surrounds the distal end tip cap 22 of the airfoil section 14. The distal edge 35 may be the particular interface or intersection between the distal end tip cap 22 and the respective suction side 32 and pressure side 34 aerodynamic surfaces of the airfoil section 14. Or, the distal edge 35, as used herein, may be more generally defined as distal outline of the airfoil section's distal end portion proximate the distal end portions of the airfoil's aerodynamic surfaces. In the embodiment of blade 10, the distal edge 35 takes the shape of the outline or perimeter of a commonly recognized planar airfoil, where the planar airfoil is a longitudinal, or chordwise cross-section to the airfoil section 14, wherein this chord-wise cross-section may be the distal end surface 22 of the blade 10. However, for alternate embodiments of blade 10, the distal edge 35 may have an alternate shape or configuration, which may not be an airfoil at all. Furthermore, the distal edge 35 need not circumscribe or completely surround the distal end portion of a blade, but may extend for only a portion thereof. And, the distal edge 35 may not be at the absolute distal end point of the blade or its aerodynamic surfaces, but may be somewhat proximate that point, and instead may lie somewhere on the distal end portion of the blade, forming a peripheral edge around such distal end portion.

The distal end portion of airfoil section 14 also includes a number of longitudinal cooling slots 24 aligned parallel to and along the distal edge 35 as shown in FIG. 1. The longitudinal cooling slots 24 are defined by the distal end portion of the airfoil section 14, the tip cap 22, the distal edge 24, or a combination thereof. The slots 24 are located along discrete adjoining portions of the distal end surface 22 and the outer aerodynamic surfaces of the airfoil section 14. As used herein, "longitudinal" shall mean of or extending along a defined axis or length, which in this case is the contour of the distal edge 24, or proximate and/or parallel thereto. The cooling slots 24 are more specifically illustrated and described with regard to FIGS. 2-4 below.

FIG. 2A is a cut-away spanwise sectional view of the distal end portion of the gas turbine engine blade 10 of FIG. 1, taken along lines A-A in FIG. 1. Referring to FIG. 2, the airfoil section 14 further includes at least one internal cavity 26 defined by an external wall 28 and end wall 30, wherein the internal cavity 26 is configured for receiving cooling air extracted from the turbine engine's compressor. The external wall 30 includes the suction side surface 32 and the pressure side surface 34, each extending chordwise between the leading edge 18 and the trailing edge 20 of the airfoil section 14, and spanwise between the platform 16 and the airfoil tip 22. (See also FIG. 1) A stationary blade outer air seal 36 is also displayed, maintaining a minimal clearance "t" with the surface 36 of the airfoil tip 22.

The longitudinal cooling slots 24 are also shown, which may be diffusion-cooling slots. Slots 24 are in fluid communication with the internal cavity 26, through several fluid paths or passages. An metering cavity 38 is interposed between the internal cavity 26 and each of the diffusion-cooling slots 24, where a first set of metering holes or orifices 40 fluidly connects the internal cavity 26 to each particular metering cavity 38. A second set of metering holes 42 fluidly connects each particular metering cavity 38 to a diffusion-cooling slot 24, such that cooling air from the internal cavity 26 flows through the first set of metering holes 40 into the metering cavity 38 and through the second set of metering hole 42 into the diffusion-cooling slot 24. The metering cavities 38 are substantially smaller than the internal cavity, but may vary in volume in range between half the volume of the internal cavity 26 to an infinitesimal volume.

The metering cavity 38, first set of metering holes 40, and second set of metering holes 42 are configured such that the pressure of the cooling fluid in the metering cavity 38 is less then the pressure of the cooling fluid in the internal cavity 26. The cooling fluid successively decreases in pressure upon sequentially entering (i) the metering cavity 38, and (ii) the diffusion-cooling slots 24, thereby more uniformly distributing the cooling fluid into the diffusion-cooling slots 24. This decrease in pressure of the cooling fluid minimizes penetration of the cooling fluid into the core gas pathways in the turbine, creating a build-up of cooling fluid boundary layers adjacent to the airfoil section 14 and its aerodynamic surfaces.

In an exemplary operation, cooling air is bled off from the compressor section of the turbine engine (not shown) and is routed into the internal cavity 26 of the airfoil 14 by means well known in the art. Cooling air disposed within the internal cavity 26 proximate the airfoil tip 22 is at a lower temperature and higher pressure than the core gas flowing about the external wall 28. The pressure difference across the external wall 28 forces the cooling air from the internal cavity 26 to flow through the first set of metering holes 40 and into the metering cavity 38, where the pressure of the cooling air is decreased. The cooling air exits the metering cavity 38 through the second set of metering holes 42, diffusing into the air already in the diffusion-cooling slot 24 and distributes within the diffusion-cooling slot 24 in a substantially uniform manner. The exiting flow forms a film of cooling air that extends downstream on the tip surface.

It can be seen in FIG. 2A that the two sets of metering orifices 40 and 42 are offset from one another. A first metering orifice 40 is aligned to have a central axis, or axis of fluid flow A1, for fluid to flow into an metering cavity 38 from the internal cavity 26 as shown. A second metering orifice 42 is aligned to have a central axis, or axis of fluid flow A2, for fluid to flow from the metering cavity 38 into a longitudinal cooling slot 24 as shown. Axis A1 and axis A2 may be parallel, and may also be offset from one another, in that they are not co-linear, nor do they lie in planes that are co-planar. Furthermore, metering orifices 40 may have a diameter equal to or greater than the diameter of metering orifices 42, or, may be of a lesser diameter.

It can also be seen in FIG. 2A that the distal end portion of the airfoil section 14 terminates at a distal edge which circumscribes a distal end surface 37 and forms a sharp angular lip 39 having an acute angle $\theta$. The acute angle $\theta$ may be any angle less than ninety degrees. As shown in the cross-sectional view of FIG. 2A, the airfoil section 14 circumscribes a maximum cross-sectional span D1 of the airfoil section. Whereas the distal edge 39 circumscribes a maximum cross-sectional span D2 of the distal end portion. The maximum cross-sectional span D1 of the distal end portion is slightly larger than the maximum cross-sectional span D1 of the airfoil section. As used herein, the term "span" shall mean the maximum dimension or thickness of the cross-section of the blade when such section is taken transverse to the lengthwise axis of the blade. As such, the maximum cross-sectional breadth of the distal end surface 37, extending out the tips of the angular lips 39, is slightly larger than the maximum breadth of the portion of the airfoil section 14 enveloped the outer aerodynamic surface of the blade as formed by the suction side surface 32 and the pressure side surface 34.

FIG. 2B is a schematic longitudinal view of a portion of the airfoil distal edge circumscribing the distal end portion of the blade in FIG. 1, taken along lines B-B in FIG. 2A. Only the second set of metering orifices 24 and longitudinal slots 24 are explicitly shown, as well as outlines of the first set of metering orifices 40 and metering cavities 38, all arranged along the outline of the distal edge 35, as shown. The actual walls and surfaces of the blade are not shown for clarity. As illustrated in FIG. 2B, the first set of metering orifices 40 are grouped into discrete sets. Such sets are each uniquely in fluid communication with a particular metering cavity 38. Likewise, the second set of metering orifices 42 are also grouped into discrete sets, and such sets are also uniquely in fluid communication with a particular metering cavity 38, as well as with a particular longitudinal cooling slot 24. Thus, a discrete set or number of first metering orifices 40, grouped with a particular metering orifice 38, grouped with a discrete set or number of second metering orifices 42, collectively form a single cooling cell 43.

Cooling cell 43 defines a single self-containing network or pathway of multiple fluid passages for fluid to flow from the internal cavity 26 out of the blade 10. Blade 10 includes a number of first metering orifices 40, a number of second metering orifices 42, a number of metering cavities 38, and a number of cooling slots 24. Each cooling cell 43 may have at least two of the first metering orifices 40, at least two of the second metering orifices 42, one of the metering cavities 38 and one of the longitudinal cooling slots 24. In one exemplary embodiment, each such cooling cell 43 includes three first metering orifices 40 and six second metering orifices 42. It will be understood that many different permutations and combinations of various orifice numbers may also be utilized. It will also be appreciated that each longitudinal cooling slot 24 of each cooling cell 43 is disposed along a unique discrete portion of the distal edge 35.

Figure 3:
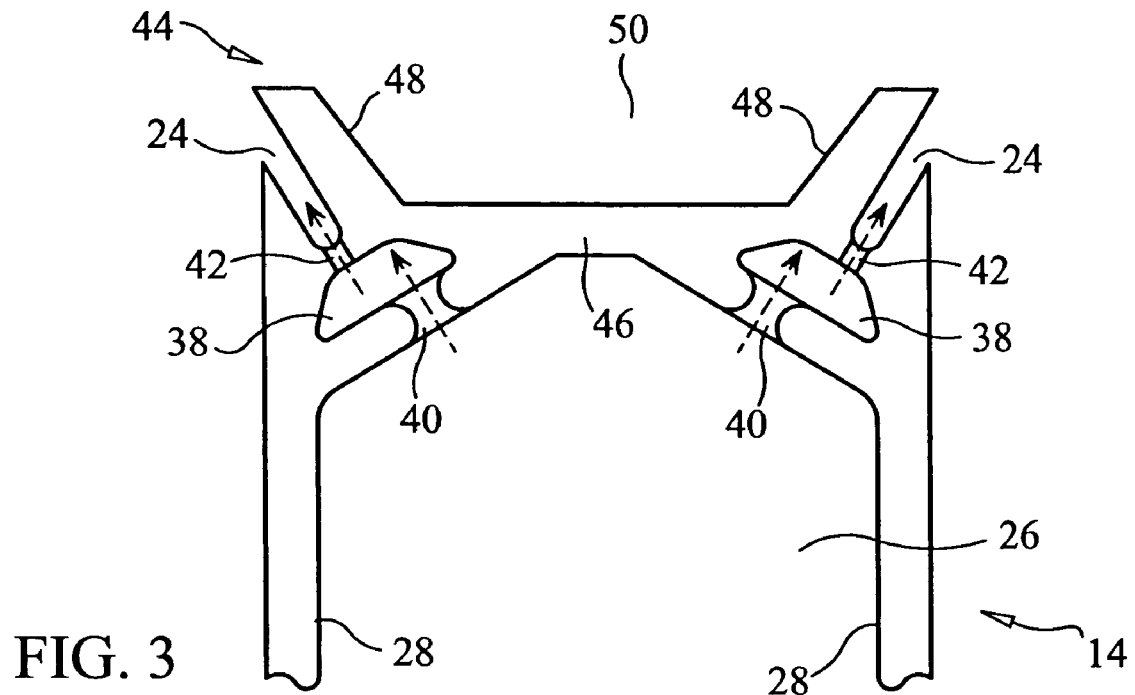
FIG. 3 is a cut-away spanwise sectional view of the distal end portion of a second embodiment of the gas turbine engine blade of FIG. 1, including a squealer tip, taken along a view analogous to the view in FIG. 2A.

Referring now to FIG. 3, a second exemplary embodiment of the present invention is shown. FIG. 3 is a cut-away spanwise sectional view of the distal end portion of a second embodiment of the gas turbine engine blade of FIG. 1, including a squealer tip, taken along a view analogous to the view in FIG. 2A. The airfoil section 14 now includes a distal squealer tip 44, where the squealer tip 44 is defined by an airfoil end wall 46 which caps the internal cavity 26 of the airfoil 14. A squealer tip wall 48 extends from the end wall 46, which together define a squealer tip cavity 50. The squealer tip wall 48 generally envelops the squealer tip cavity 50 all the way around the periphery of the end wall 46, and approximately traces the distal edge 35 of the distal end portion of the airfoil 14. The intersection of the squealer tip wall 48 and the external wall 28 includes a series of diffusion-cooling slots 24, wherein the diffusion-cooling slots 24 are in fluid communication with the internal cavity 26. Metering cavities 38, metering holes 40, and metering holes 42 are arranged in the blade similar to that of previously discussed embodiments, such that cooling fluid from the internal cavity 26 flows through the first set of metering holes 40 into the metering cavity 38 and through the second set of metering holes 42 to the diffusion cooling slot 24.

Figure 4:
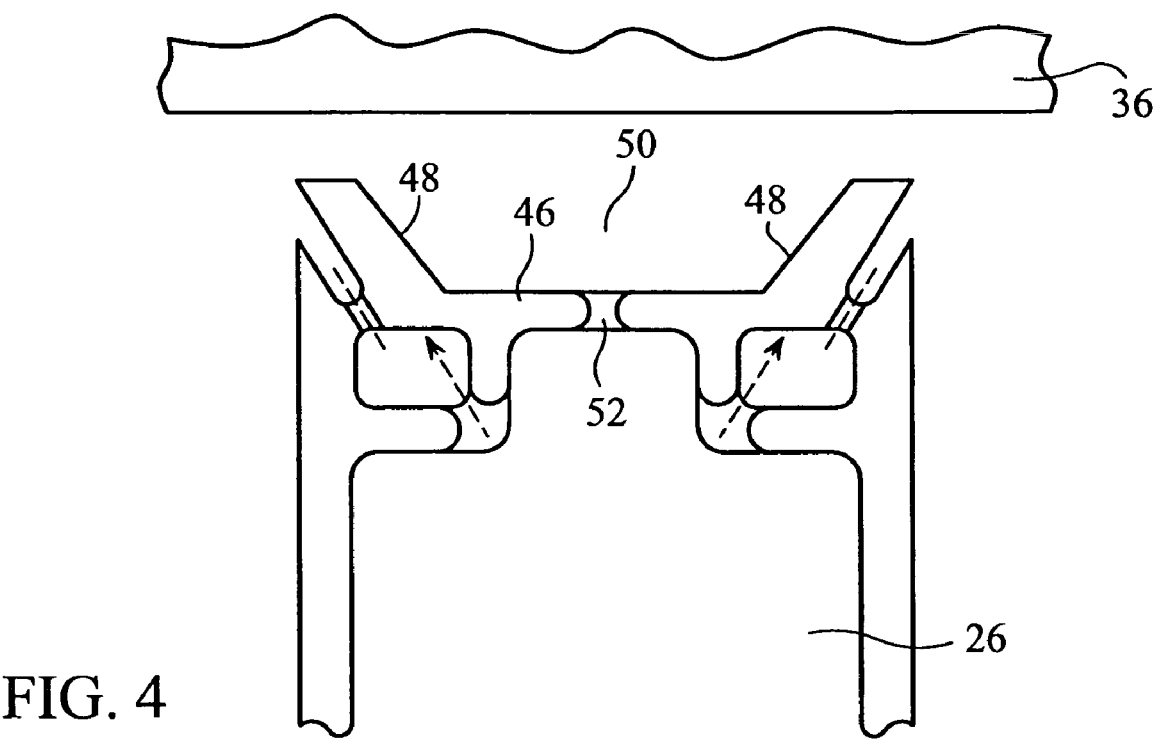
FIG. 4 is a cutaway spanwise sectional view of the distal end portion of a third embodiment of the gas turbine engine blade of FIG. 1, including a cooling hole in the squealer tip, taken along a view analogous to the view in FIG. 2A.

Due to the effect of viscous forces augmented heat can occur in the squealer cavity, further heating the end wall. In addition, planned or unplanned rubbing between the shroud 36 and the squealer tip walls 48 can produce heating due to friction. As shown in FIG. 4, the end wall 46 further includes at least one cooling hole or aperture 52 fluidly connecting the internal cavity 26 to the squealer tip cavity 50. Cooling fluid disposed within the internal cavity 26 proximate the end wall 46 is at a lower temperature and higher pressure then the gas in the squealer tip cavity 50. The pressure difference across the end wall 46 forces the cooling fluid from the internal cavity 26 to flow through the diffusion-cooling holes 52 into the squealer tip cavity 50.

In a further exemplary embodiment (not shown), multiple metering cavities are interposed between the internal cavity 26 and each of the diffusion-cooling slots 24, wherein the multiple metering cavities are fluidly connected in series to incrementally step down the cooling air pressure. The cooling fluid travels from the internal cavity 26, through a series of sets of metering holes and metering cavities to the diffusion-cooling slot 24. The metering cavities and sets of metering holes are configured such that the pressure of the cooling fluid in the metering cavities incrementally decreases the pressure of the cooling fluid as it travels from the internal cavity 26. This incremental sequential decrease in pressure of the cooling fluid allows for a more controlled and uniform distribution of cooling fluid into the diffusion cooling slots 24 and out of the blade 10, so as to more efficiently and effectively cool the blade 10, especially around the critical distal tip region, where the highest loads can occur.

In addition, the present invention can control the pressure conditions at the pressure and suction side surfaces of the blade to enable a blowing ration close to one, where the blowing ratio is defined as the product of the fluid density and velocity of the gases flowing out at the exit of the blade over the product of the fluid density and velocity of the hot gases around the blade. This equalization of the blowing ratio helps also film to lay down on the metal surface of the blade.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A turbine airfoil, comprising:
   a pressure side;
   a suction side;
   a distal end portion;
   an internal cavity;
   a metering cavity;
   a first metering hole connecting the internal cavity to the metering cavity;
   a cooling slot having a cavity with an opening at a surface of the airfoil; and
   a plurality of second metering holes connecting the metering cavity to the cooling slot, wherein the cooling slot is fluidly coupled with two or more of the plurality of second metering holes.

2. The turbine airfoil of claim 1 and further comprising:
   the first metering hole is axially offset from the second metering hole.

3. The turbine airfoil of claim 2, wherein the first metering hole is offset from the second metering hole toward a center of the internal cavity.

4. The turbine airfoil of claim 1, further comprising:
   a first diameter associated with the first metering hole; and
   a second diameter associated with the second metering hole, wherein the first diameter is larger than the second diameter.

5. The turbine airfoil of claim 1, wherein the cooling slot is aligned along a tip of the airfoil on the pressure side.

6. The turbine airfoil of claim 1, further comprising:
   at least two first metering holes that connect the internal cavity to the metering cavity.

7. The turbine airfoil of claim 1, and further comprising:
   a plurality of cooling slots;
   each cooling slot being associated with a respective metering cavity; and,
   at least one second metering hole connecting each cooling slot to the respective metering cavity.

8. The turbine airfoil of claim 1, and further comprising:
   the cooling slot being located on the pressure side of the airfoil.

9. The turbine airfoil of claim 8, further comprising:
   a second cooling slot located on the suction side of the airfoil;
   a second metering cavity; and
   a second metering hole connecting the second metering cavity to the second cooling slot.

10. The turbine airfoil of claim 1, wherein the cooling slot has a substantially rectangular cross-sectional shape.

11. The turbine airfoil of claim 1, Wherein the metering cavity has a volume that is less than one half of a volume of the internal cavity.

12. The turbine airfoil of claim 1, wherein the first metering hole is positioned to impingement cool an internal surface of an airfoil tip that contacts the metering cavity.

13. A process for cooling an airfoil of a turbine, the airfoil having an internal cavity for supplying a cooling fluid at an internal cavity pressure, the process comprising the steps of:
    metering the cooling fluid from the internal cavity into a metering cavity at a pressure lower than the internal cavity pressure;
    metering the cooling fluid from the metering cavity into a slot that opens onto a surface of the airfoil, the air pressure in the slot being at a lower pressure than the pressure in the metering cavity;
    enabling the slot to receive metered cooling fluid from two or more of second cooling fluid holes; and
    discharging the cooling air from the slot onto the surface of the airfoil.

14. The process for cooling an airfoil of a turbine of claim 13, and further comprising the steps of:
    providing for a plurality of first cooling fluid holes connecting the internal cavity to the metering cavity;
    providing for a plurality of second cooling fluid holes connecting the metering cavity to the slot; and,
    providing for the number of first cooling fluid holes to be less than the number of second cooling fluid holes.

15. The process for cooling an airfoil of a turbine of claim 14, and further comprising the step of:
    providing for the first cooling fluid holes to be larger in diameter than the second fluid cooling holes.

16. The process for cooling an airfoil of a turbine of claim 14, and further comprising the step of:
    providing for the first cooling fluid holes to be radially offset inward from the second cooling fluid holes.

17. The process for cooling an airfoil of a turbine of claim 13, and further comprising the steps of:
    providing for a plurality of slots arranged along an edge of a tip of the airfoil; and,
    providing for a metering cavity for each slot.

18. The process for cooling an airfoil of a turbine of claim 13, and further comprising the step of:
    providing for the slot to have an opening onto the surface of the airfoil, the opening having a substantially rectangular cross-sectional shape.

19. The process for cooling the airfoil of the turbine of claim 13, further comprising directing the metered cooling fluid from the internal cavity to the metering cavity to impingement cool an internal surface of an airfoil tip that contacts the metering cavity.

20. A process for cooling an airfoil of a turbine, the process comprising the steps of:
    supplying a cooling fluid into an internal cavity of the airfoil;
    metering the cooling fluid into a metering cavity;
    metering the cooling fluid into a plurality of cooling holes; and
    providing a slot in fluid communication with at least one of the plurality of cooling holes for expelling the cooling fluid onto a surface of the airfoil.

21. The process for cooling an airfoil of claim 20, further comprising the step of:
    providing the slot to form a cavity with an opening at the surface of the airfoil; and
    providing the plurality of cooling holes to connect the metering cavity to the slot.

22. The process for cooling an airfoil of claim 21, further comprising the step of:
    providing a plurality of slots, each slot having a respective metering cavity connected thereto by one or more of the plurality of cooling holes.

23. The process for cooling the airfoil of the turbine of claim 20, further comprising directing the metered cooling fluid from the internal cavity to the metering cavity to impingement cool an internal surface of an airfoil tip that contacts the metering cavity.

24. A turbine airfoil having a pressure side and a suction side, and an internal cavity for supplying a cooling fluid to an outer surface of the airfoil, comprising:
    a diffusion cavity;
    a first metering hole connecting the internal cavity to the diffusion cavity;
    a diffusion slot having a cavity with an opening at a surface of the airfoil; and,
    a plurality of second metering holes connecting the diffusion cavity to the diffusion slot, whereby the cooling fluid supplied to the internal cavity flows into the diffusion cavity, into the diffusion slot, and then onto the outer surface of the airfoil and wherein the diffusion slot is fluidly coupled with two or more of the plurality of second metering holes.

25. The turbine airfoil of claim 24, further comprising:
    a plurality of diffusion slots each opening onto the surface of the airfoil; and,
    a plurality of diffusion cavities, each diffusion slot having a respective diffusion cavity.

26. The turbine airfoil of claim 25, wherein the plurality of diffusion slots are arranged along a tip of the airfoil on the pressure side.

27. The turbine airfoil of claim 24, wherein the diffusion cavity has a volume that is less than half of a volume of the internal cavity.

28. The turbine airfoil of claim 24, wherein the opening of the diffusion slot has a substantially rectangular cross-sectional shape.

29. The turbine airfoil of claim 24, further comprises
    a plurality of first metering holes, wherein the first metering hole includes a diameter that is larger than a diameter of the second metering hole.

30. The turbine airfoil of claim 24, wherein
    the first metering hole is radially offset from the second metering hole.

31. The turbine airfoil of claim 24, wherein the first metering hole is positioned to impingement cool an internal surface of an airfoil tip that contacts the diffusion cavity.

32. A turbine airfoil, comprising:
    a pressure side;
    a suction side;
    a distal end portion;
    an internal cavity;
    a metering cavity;
    a first metering hole connecting the internal cavity to the metering cavity;
    a cooling slot opening onto a surface of the airfoil;
    a second metering hole connecting the meeting cavity to the cooling slot, wherein the cooling slot is located on the pressure side of the airfoil;

a second slot being located on the suction side of the airfoil;

a second metering cavity; and a second metering hole connecting the second metering cavity to the additional cooling slot.

33. A process for cooling an airfoil of a turbine, the airfoil having an internal cavity for supplying a cooling fluid at an internal cavity pressure, the process comprising the step of:

metering the cooling fluid from the internal cavity into metering cavity at a pressure lower than the internal cavity pressure;

metering the cooling fluid from the metering cavity into a slot opening onto a surface of the airfoil, the air pressure in the slot being at a lower pressure than the pressure in the metering cavity;

discharging the cooling air from the slot onto the surface of the airfoil;

providing for a plurality of slots arranged along an edge of a tip of the airfoil; and providing for metering cavity for each slot.

* * * * *